US011867102B2

United States Patent

(12) United States Patent
Kuter-Arnebeck

(10) Patent No.: US 11,867,102 B2
(45) Date of Patent: Jan. 9, 2024

(54) PNEUMATIC TOOL EXHAUST MUFFLER

(71) Applicant: Snap-on Incorporated, Kenosha, WI (US)

(72) Inventor: Ottoleo Kuter-Arnebeck, Kenosha, WI (US)

(73) Assignee: Snap-on Incorporated, Kenosha, WI (US)

(*) Notice: Subject to any disclaimer, the term of this patent is extended or adjusted under 35 U.S.C. 154(b) by 249 days.

(21) Appl. No.: 16/864,968

(22) Filed: May 1, 2020

(65) Prior Publication Data

US 2021/0062695 A1 Mar. 4, 2021

Related U.S. Application Data

(60) Provisional application No. 62/892,598, filed on Aug. 28, 2019.

(51) Int. Cl.
*F01N 1/02* (2006.01)
*G10K 11/172* (2006.01)
*B25D 17/12* (2006.01)

(52) U.S. Cl.
CPC ............. *F01N 1/023* (2013.01); *B25D 17/12* (2013.01); *G10K 11/172* (2013.01); *F01N 2590/06* (2013.01)

(58) Field of Classification Search
CPC ..... F01N 1/023; F01N 2590/06; B25D 17/12; G10K 11/172
USPC .......................................... 181/230, 279, 280
See application file for complete search history.

(56) References Cited

U.S. PATENT DOCUMENTS 3,224,527 A 12/1965 Waldron
3,255,844 A 6/1966 Wallace
3,330,378 A 7/1967 Waldron
3,554,316 A 1/1971 Judd et al.
3,635,299 A 1/1972 Hayes
3,688,869 A 9/1972 Murphy
3,815,705 A 6/1974 Bennett
3,880,245 A 4/1975 Anderson, Jr.
3,891,049 A 6/1975 Stroezel et al.
3,918,549 A 11/1975 Murphy
4,049,075 A 9/1977 Murphy
4,049,076 A 9/1977 Murphy
4,113,052 A 9/1978 McElroy, Jr.
4,122,913 A * 10/1978 Stemp ........................ F01N 1/10 181/279
4,244,442 A 1/1981 Scarton et al.
(Continued)

FOREIGN PATENT DOCUMENTS

EP 1291570 A2 3/2003
EP 3278934 B1 * 2/2021 ................ B25F 5/00
(Continued)

OTHER PUBLICATIONS

Examination Report No. 1 for Application No. 2020210257 dated Mar. 5, 2021, 7 pages.
(Continued)

*Primary Examiner* — Jeremy A Luks
(74) *Attorney, Agent, or Firm* — Seyfarth Shaw LLP

(57) ABSTRACT

A high pass muffler for a pneumatic tool that allows for high pass through of exhaust air. The muffler dampens noise generated by the exhaust air by incorporating channels in walls of the muffler that act as Helmholtz resonators.

17 Claims, 9 Drawing Sheets

(56) References Cited

U.S. PATENT DOCUMENTS

| | | | | |
|---|---|---|---|---|
| 4,294,330 | A | 10/1981 | Baldwin et al. | |
| 4,327,817 | A | 5/1982 | Scarton et al. | |
| 4,346,783 | A * | 8/1982 | Scarton | F01N 1/20 181/239 |
| 5,142,952 | A | 9/1992 | Putney et al. | |
| 5,231,901 | A | 8/1993 | Putney et al. | |
| 5,237,885 | A | 8/1993 | Putney et al. | |
| 5,302,783 | A | 4/1994 | Sadr et al. | |
| 5,309,714 | A | 5/1994 | Putney et al. | |
| 5,418,339 | A | 5/1995 | Bowen et al. | |
| 5,581,055 | A | 12/1996 | Self et al. | |
| 5,844,178 | A * | 12/1998 | Lothringen | F01N 1/12 181/269 |
| 5,847,334 | A | 12/1998 | Taga | |
| 5,909,016 | A | 6/1999 | Sterling | |
| 5,952,623 | A | 9/1999 | Sterling | |
| 5,952,625 | A | 9/1999 | Huff | |
| 6,009,705 | A | 1/2000 | Arnott et al. | |
| 6,062,323 | A | 5/2000 | Pusateri et al. | |
| 6,209,678 | B1 | 4/2001 | Sterling | |
| 6,530,436 | B2 | 3/2003 | Nowak, Jr. et al. | |
| 6,595,319 | B1 | 7/2003 | Huff | |
| 6,668,971 | B2 | 12/2003 | Sterling | |
| 6,751,952 | B2 | 6/2004 | Chen | |
| 6,926,117 | B2 | 8/2005 | Sterling | |
| 7,069,819 | B2 | 7/2006 | Albertson et al. | |
| 7,216,739 | B2 | 5/2007 | Sterling | |
| 7,770,694 | B2 * | 8/2010 | Baars | F04C 29/068 181/266 |
| 7,798,286 | B2 | 9/2010 | Skowronski et al. | |
| 8,047,327 | B2 | 11/2011 | Audeval | |
| 8,192,156 | B2 | 6/2012 | Cheng | |
| 9,126,322 | B2 | 9/2015 | Yaschur et al. | |
| 9,381,637 | B1 | 7/2016 | Sun | |
| 9,638,088 | B1 | 5/2017 | Shoshi et al. | |
| 9,925,655 | B2 | 3/2018 | Sterling | |
| 2002/0035876 | A1 | 3/2002 | Donaldson, Jr. | |
| 2004/0177980 | A1 | 9/2004 | Lucas | |
| 2006/0289184 | A1 | 12/2006 | Cheng | |
| 2007/0028724 | A1 | 2/2007 | Albertson et al. | |
| 2007/0084311 | A1 | 4/2007 | Albertson et al. | |
| 2007/0251709 | A1 | 11/2007 | Sun et al. | |
| 2008/0099277 | A1 | 5/2008 | Liu et al. | |
| 2009/0014238 | A1 | 1/2009 | Huff et al. | |
| 2009/0294211 | A1 | 12/2009 | Roberts | |
| 2010/0155174 | A1 | 6/2010 | Roberts et al. | |
| 2010/0270103 | A1 | 10/2010 | Huff et al. | |
| 2019/0247990 | A1 | 8/2019 | Sun | |

FOREIGN PATENT DOCUMENTS

| | | | |
|---|---|---|---|
| GB | 2534974 | A | 8/2016 |
| JP | 2016190288 | A | 11/2016 |
| KR | 20060061546 | A | 6/2006 |
| KR | 101301608 | B1 | 8/2013 |
| TW | 523570 | | 3/2003 |
| TW | I500490 | | 9/2015 |
| TW | M550676 | | 10/2017 |

OTHER PUBLICATIONS

Canadian Office Action for corresponding Application No. 3,091,032 dated Jan. 6, 2022, 4 pages.

Combined Search and Examination Report for corresponding Application No. GB2118599.6 dated Jan. 10, 2022, 4 pages.

Examination Report No. 2 for corresponding Application No. 2020210257 dated Feb. 14, 2022, 3 pages.

Examination Report No. 3 for corresponding Application No. 2020210257 dated Mar. 1, 2022, 3 pages.

Examination Report No. 4 for corresponding Application No. 2020210257 dated Mar. 7, 2022, 4 pages.

Taiwan Office Action for corresponding Application No. 11021259740 dated Dec. 28, 2021, 5 pages.

Taiwan Office Action for corresponding TW Application No. 109128909, dated Aug. 30, 2021, 8 pages.

United Kingdom Examination Report for corresponding UK Application No. GB2012423.6, dated Sep. 10, 2021, 4 pages.

Uk Combined Search and Examination Report for Application No. GB2012423.6 dated Jan. 12, 2021, 6 pages.

Office Action for corresponding Application No. 202010868815.7 dated Aug. 4, 2022, 6 pages.

* cited by examiner

PNEUMATIC TOOL EXHAUST MUFFLER

CROSS REFERENCES TO RELATED APPLICATIONS

This application claims priority to, and the benefit of, U.S. Provisional Patent Application Ser. No. 62/892,598, filed Aug. 28, 2019, the contents of which are incorporated herein by reference in their entirety.

TECHNICAL FIELD OF THE INVENTION

The present invention relates generally to pneumatic tools. More particularly, the present invention relates to a muffler for a pneumatic tool.

BACKGROUND OF THE INVENTION

Mufflers are often used in exhaust ports of air powered tools (also referred to as pneumatic tools) to reduce the amount of noise generated by the exhaust of the tools. Air powered tools can produce high noise levels in excess of 80 dB, particularly when used in large numbers in a confined spaces, such as on production lines. The noises generated by the exhaust are derived from pass frequencies of air passing over turbine motors that drive the air tools and high speed of the exhaust air flow. In addition, noise is generated by vibration-radiated sound produced by the moving parts of the tool. The noises generated by the tool are a significant contributor to workplace injuries, such as hearing loss. In addition, loud noises over long periods of time induce operator fatigue.

Current solutions muffle exhaust noise of pneumatic tools by placing sponge like or fibrous materials in the exhaust ports. However, these materials cause the air flow to be restricted, which slows the air flow and converts kinetic and acoustic energy into thermal energy, thereby reducing the amount of noise generated by the exhaust. A consequence of adding these materials to the exhaust ports is that the air flow is restricted and the tool is thus throttled.

SUMMARY OF THE INVENTION

The present invention broadly comprises a muffler for air powered tools that minimizes pass through restriction of exhaust air. Noise generated by the exhaust air is dampened or mitigated by incorporating one or more cavities within walls of the exhaust path or in side branches of the exhaust path to act as Helmholtz resonators. The cavities may be dimensioned to be quarter-wavelength, half-wavelength, or an integer or opposing wavelength of target frequencies of the noise generated by the exhaust. Typically, target exhaust noise frequencies of pneumatically operated power tools range from 50 Hz to 10 kHz.

Accordingly, the present invention improves upon muffler technology for air powered tools by presenting a solution that does not restrict operation of the tool by restricting the exhaust path. By utilizing cavities located in the wall or in side branches of the exhaust path, the targeted frequencies can be canceled or dissipated while still allowing the airflow to pass relatively unrestricted through the exhaust path. Further, by locating one or more cavities in a thin wall cross section and the requisite dimensions of the cavities, the cavities can have a circuitous path.

The present invention broadly comprises a high pass muffler disposed in an air exhaust passage of a pneumatic tool. The muffler includes an outer body with a channel having a terminal end and an inner body disposed within the outer body that includes an aperture located proximate to the terminal end.

In another embodiment, the present invention broadly comprises a pneumatic tool including an air intake passage, an air exhaust passage, and a muffler disposed in the air exhaust passage. The muffler includes an outer body with a channel having a terminal end and an inner body coupled to the outer body and that includes an aperture located proximate the terminal end.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
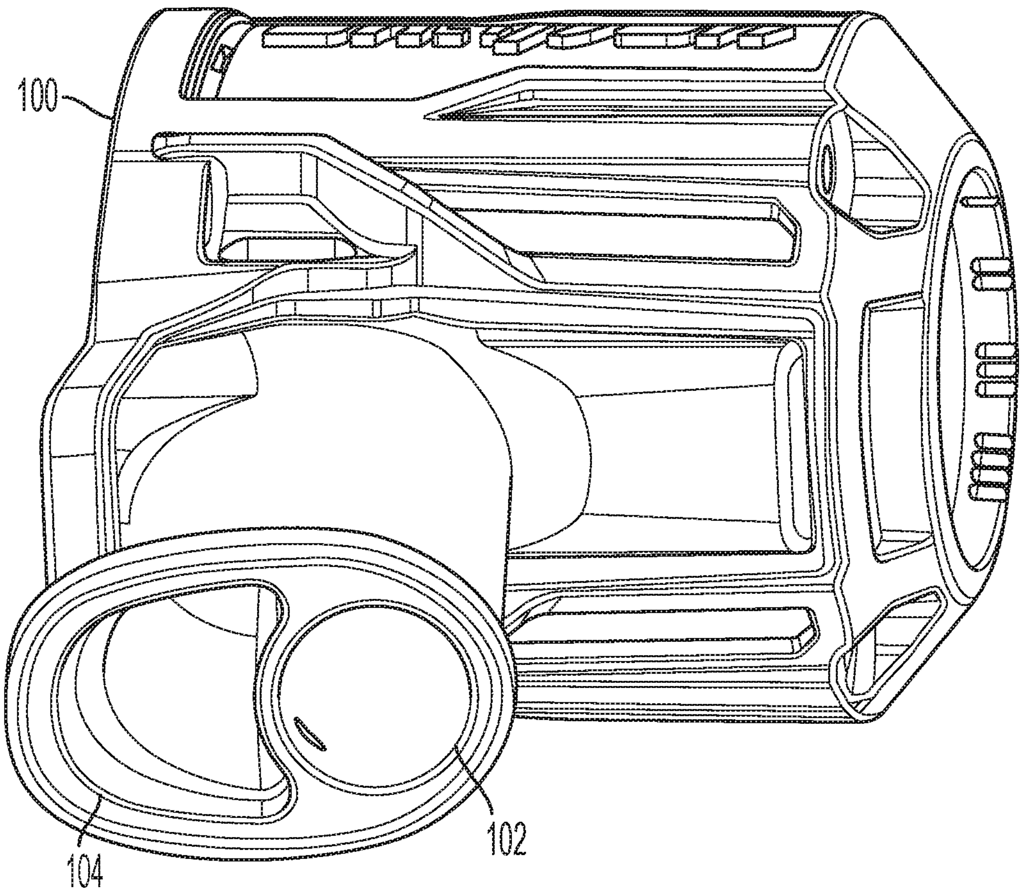
FIG. 1 is a perspective view of a housing of an air powered tool incorporating an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

Figure 2:
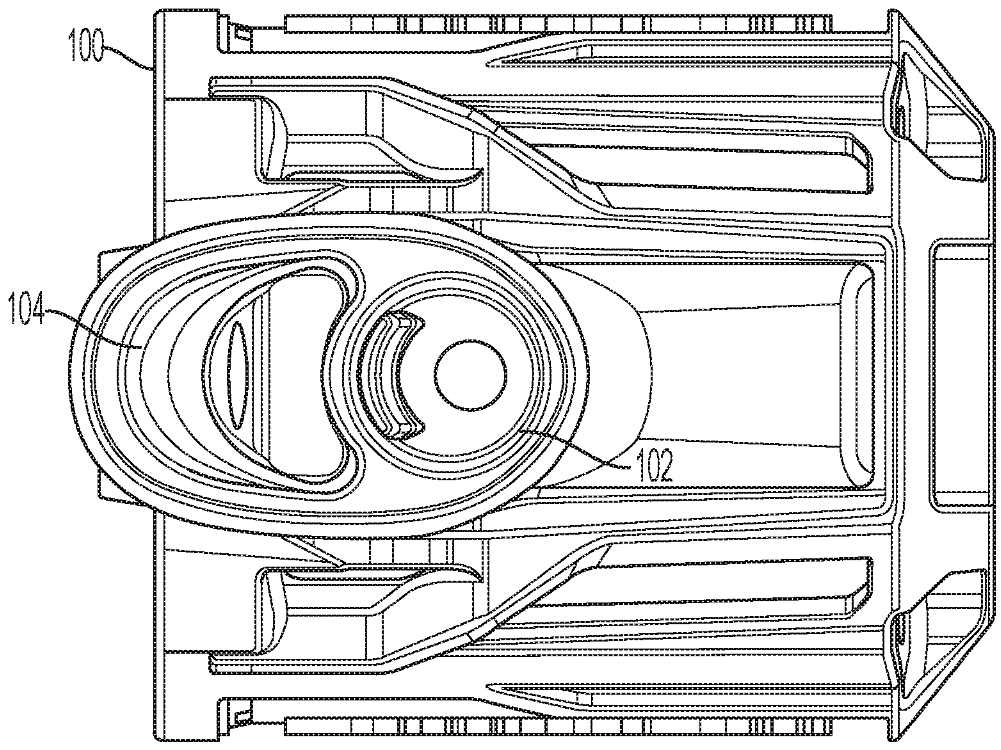
FIG. 2 is bottom plan view showing the housing of the air powered tool incorporating an embodiment of the present invention of FIG. 1.
Figure 3:
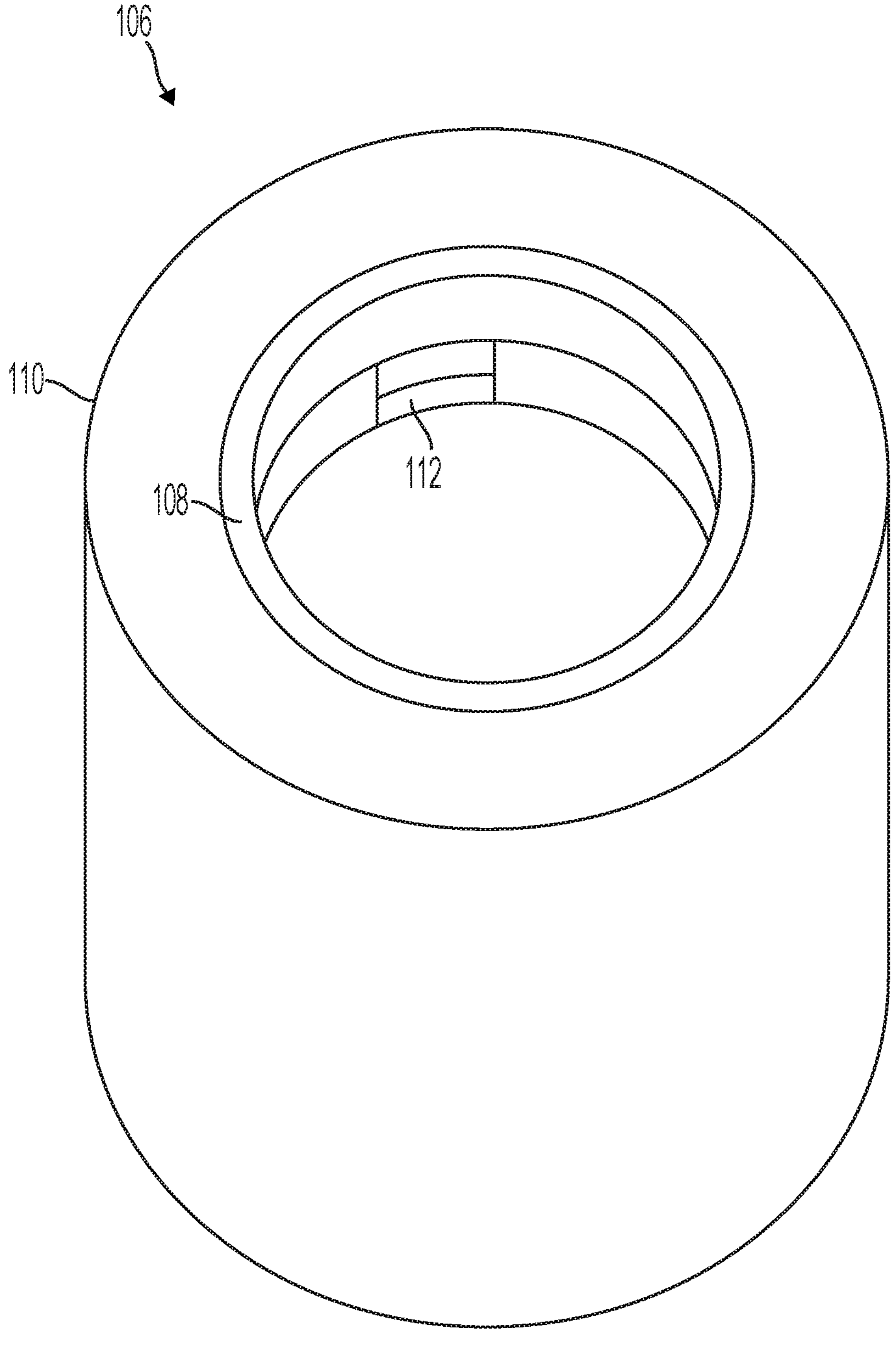
FIG. 3 is a perspective view showing a muffler according to an embodiment of the present invention.
Figure 4:
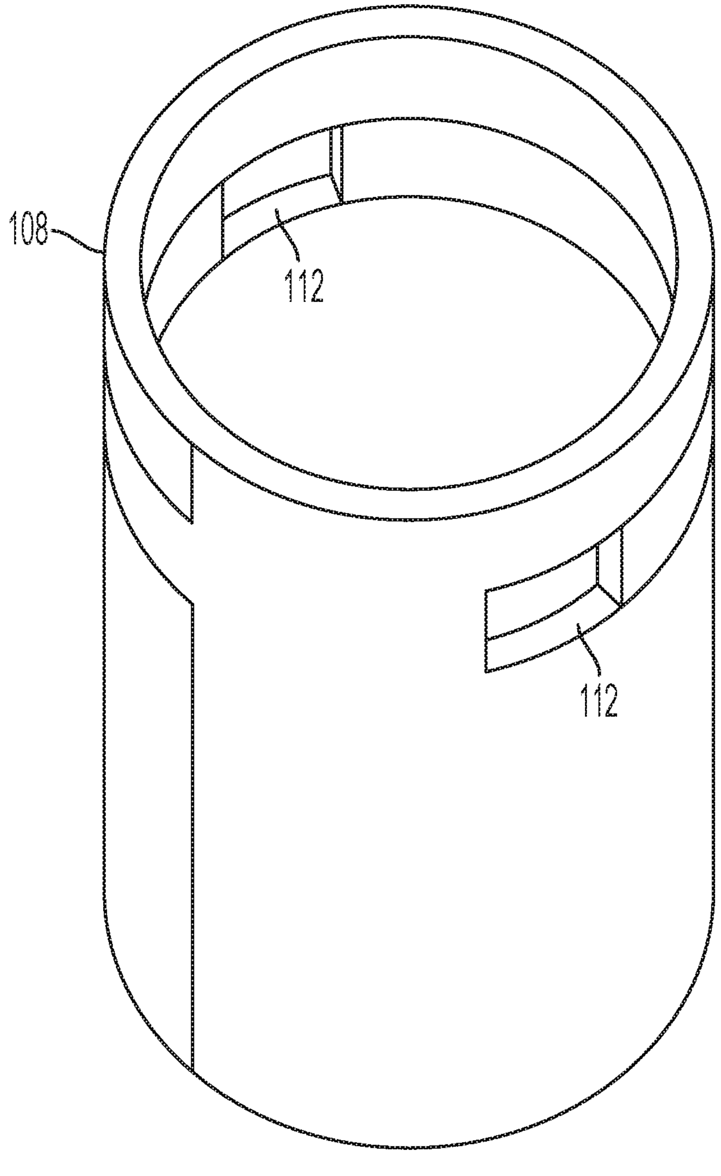
FIG. 4 is a perspective view showing an inner body of the muffler of FIG. 3.

Referring to FIGS. 1 and 2, a motor body 100 with an air intake passage 102 and an air exhaust passage 104 is shown. Air flows through the air intake passage 102 to power a motor rotor, such as a vane pump (not shown), which results in blade pass frequencies that create an audible whine-like noise. The noise frequencies are a function of the number of vanes in the vane pump (i.e., motor size) and an applied magnitude of air pressure (i.e., air velocity). The noise frequencies vary from 50 Hz to 10 kHz.

Referring to FIGS. 3-8, a muffler 106 is disposed, at least partially, within the air exhaust passage 104. The muffler 106 is, for example, a relatively tubular structure and can be constructed in two parts, where an outer surface of an inner body (also referred to as an inner tube) 108 couples or is interference fit to an inner surface of an outer body (also referred to as an outer tube) 110. While the muffler 106 is illustrated as a cylindrical tube, the cross section of the outer body 110 can be shaped to correspond with an inner surface of the air exhaust passage 104 of FIGS. 1 and 2.

In an embodiment, the inner body 108 is constructed in halves adapted to be assembled into a singular body. Similarly, in an embodiment, the outer body 110 is constructed in halves adapted to be assembled into a singular body. Once assembled, the outer body 110 is adapted to receive the inner body 108. Alternately, the outer body 110 and the inner body 108 are respectively formed as singular bodies. The outer body 110 and the inner body 108 can be constructed of polymers, ceramics, and/or organic materials, for example.

Figure 5:
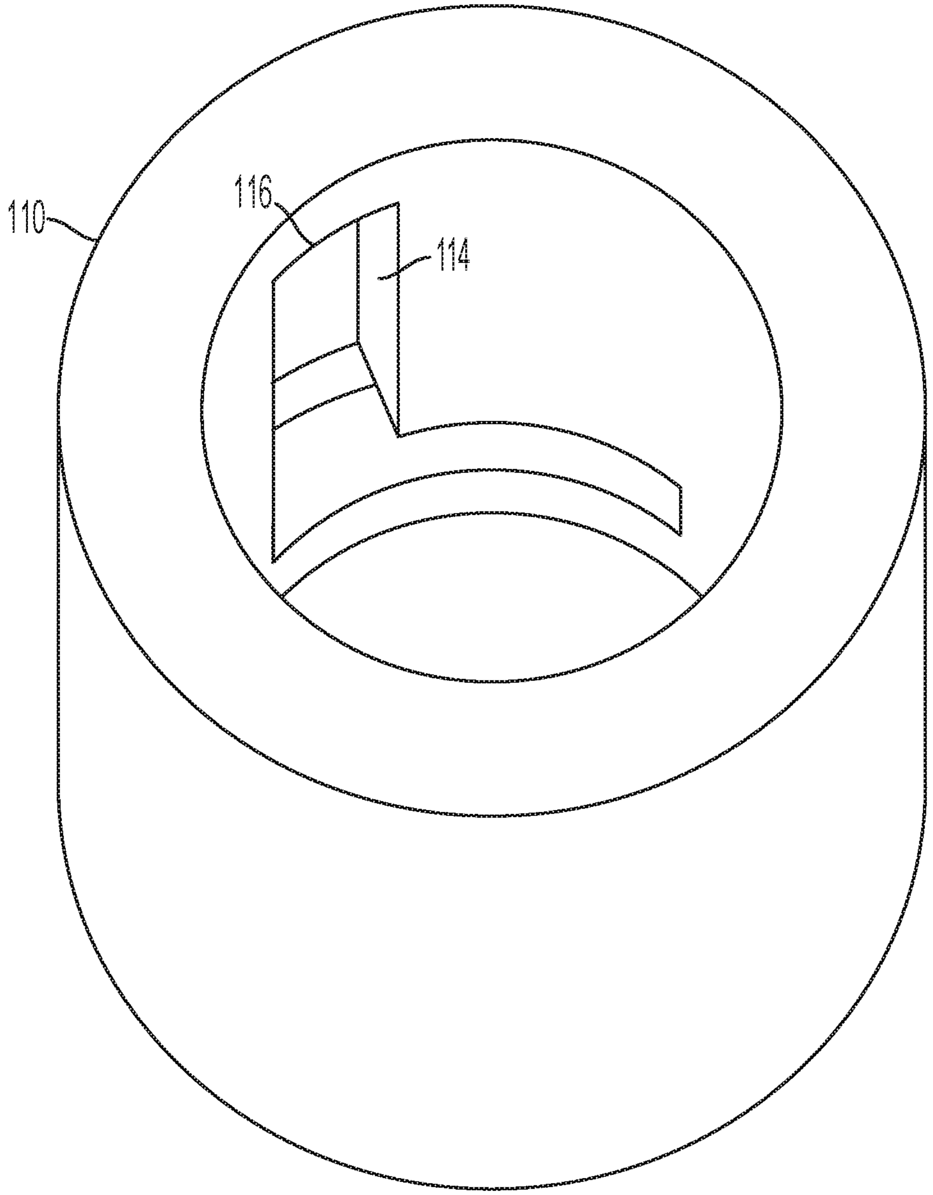
FIG. 5 is a perspective view showing an outer body of the muffler of FIG. 3.
Figure 6:
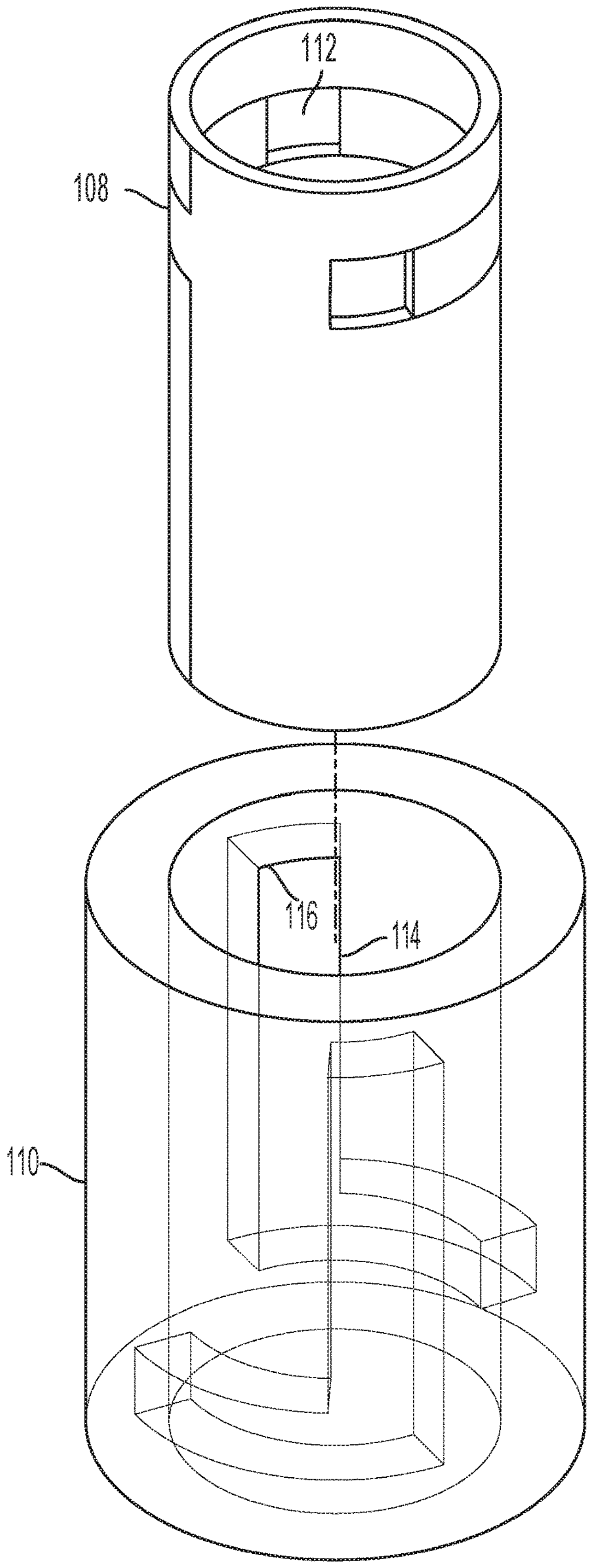
FIG. 6 is a perspective view of the muffler of FIG. 3 showing the inner body and the outer body of the muffler in a disassembled state.
Figure 7:
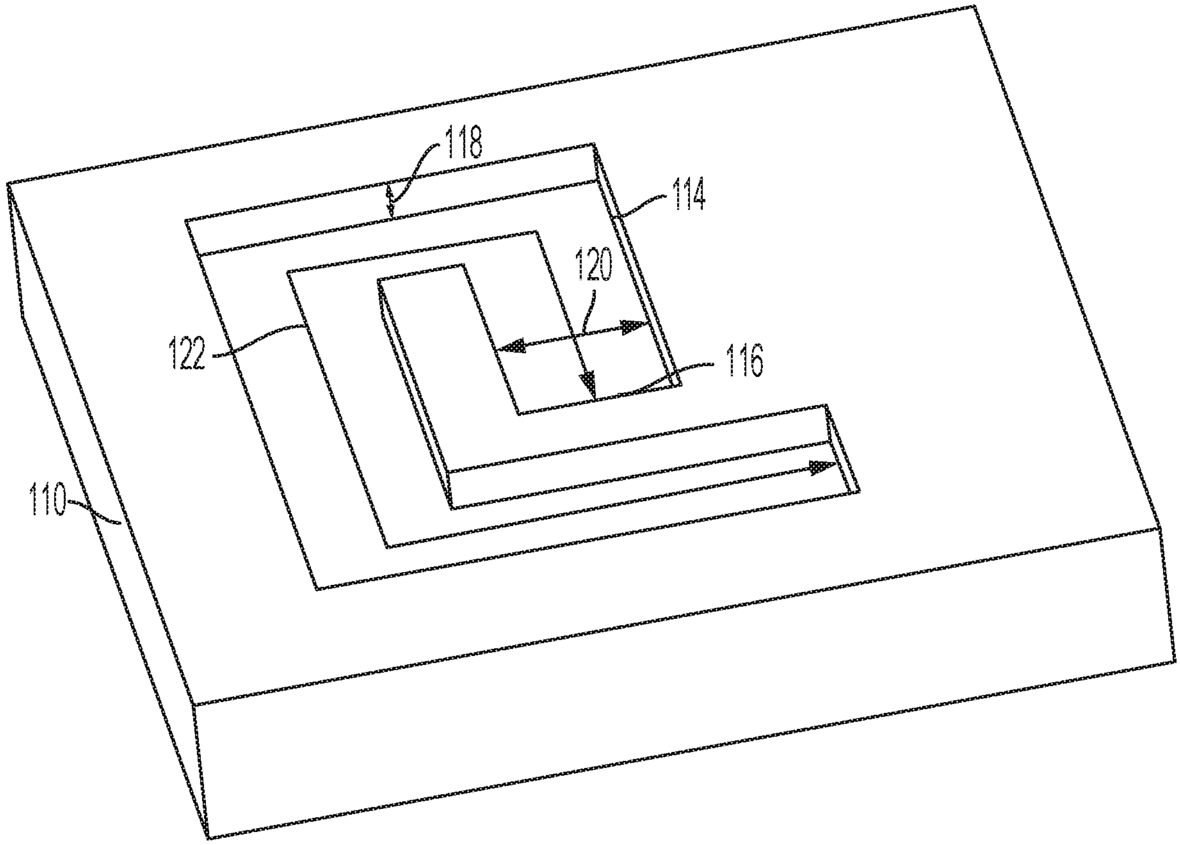
FIG. 7 is a perspective view a channel of an outer body of a muffler according to an embodiment of the present invention.

In an embodiment, the inner body 108 includes at least one aperture 112 adapted to allow exhaust air to flow therethrough and into at least one channel 114 disposed in the outer body 110. The aperture 112 is located proximate to a terminal end 116. The channel 114 may follow a circuitous path having angular corners, as illustrated in FIGS. 5 and 7, and/or a curved path without angular corners (not shown). The channel 114 acts as a Helmholtz resonator.

Figure 8:
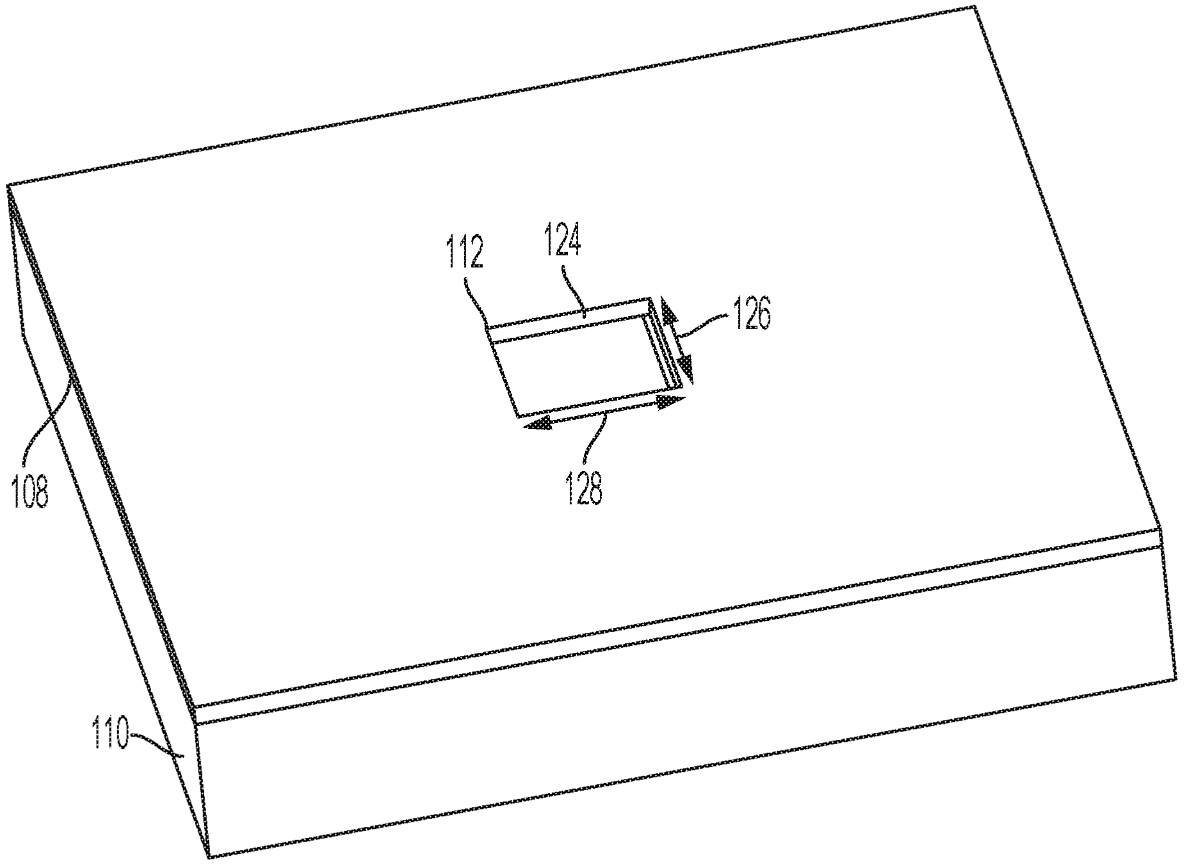
FIG. 8 is a perspective view showing a portion of a muffler according to an embodiment of the present invention.
Figure 9:
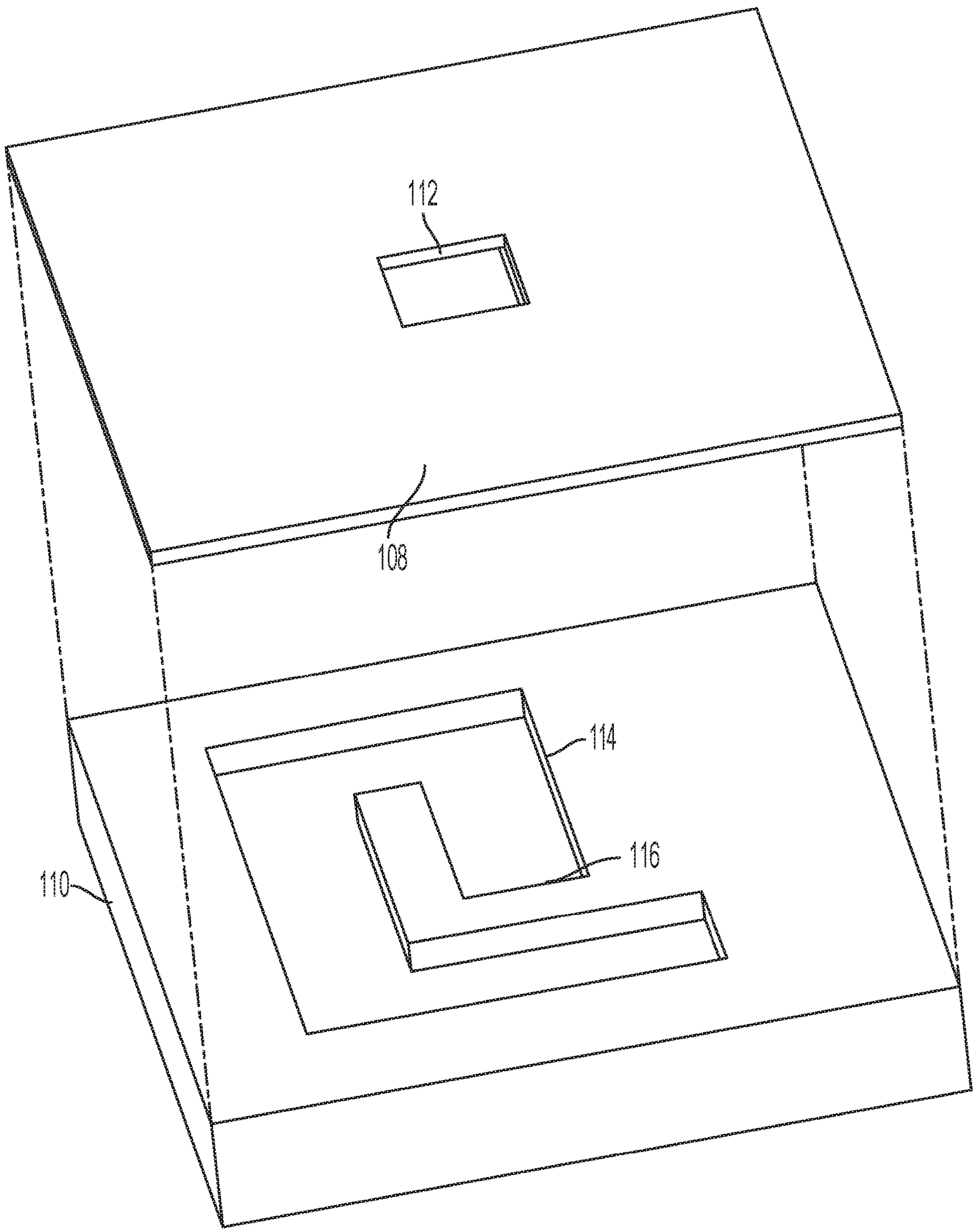
FIG. 9 is a perspective view of the muffler of FIG. 8 showing a portion of the inner body and a portion of the outer body of the muffler in a disassembled state.

The dimensions of the channel 114 include a depth of the channel 118, a width of the channel 120, and a length of the channel 122, as illustrated in FIG. 7. The dimensions of the aperture 112 include a depth 124, or wall thickness of inner body 108, and opening dimensions 126 and 128. A cross-sectional area of the opening of the aperture 112 is defined by the dimensions 126 and 128, as illustrated in FIG. 8. The aperture 112 may have other cross-sections besides a square, for example, the cross-section may have a round, a polygon, or an amorphous shape.

The dimensions of the aperture 112 and the volume and shape of the channel 114 determine the performance specifications of the muffler 106, and may be altered such that the muffler is tuned to resonate at a quarter wavelength, a half wavelength, or a full wavelength of certain target frequencies of noise generated by blade pass frequencies. The target frequencies can range from 50 Hz to 10 kHz.

In another embodiment, the muffler 106 is not contained entirely in the air exhaust passage 104, such that a portion protrudes past a terminus of the motor body 100. In this configuration, the aperture 112 and the channel 114 may extend into larger volumes, additional cavities, and/or side branches that are not contained within the walls of the outer body 110 of the muffler 106.

Accordingly, the muffler 106 does not throttle the tool by restricting the exhaust path. By utilizing the channel 114 located in the outer body 110, the targeted frequencies can be canceled or dissipated while still allowing the airflow to pass relatively unrestricted through the air exhaust passage 104.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A high pass muffler disposed in an air exhaust passage of a pneumatic tool, the high pass muffler comprising: an outer body having an inner surface; an inner body that is substantially hollow disposed within the outer body and including an aperture, wherein the inner body is adapted to allow for substantially unrestricted airflow through the air exhaust passage; and a channel formed in the inner surface and having a first terminal end disposed proximate to the aperture, a second terminal end disposed distal to the aperture, and a curved portion or an angular corner disposed between the first and second terminal ends to collectively create a Helmholtz type resonator.

2. The high pass muffler of claim 1, wherein the muffler is tuned to resonate at any one of a quarter wavelength, a half wavelength, or a full wavelength of a target frequency.

3. The high pass muffler of claim 2, wherein the target frequency is in a range from 50 Hz to 10 kHz.

4. The high pass muffler of claim 1, wherein the channel includes the angular corner and substantially follows a circuitous path.

5. The high pass muffler of claim 1, wherein the inner body is assembled from two halves.

6. The high pass muffler of claim 1, wherein the inner body is interference fit with the outer body.

7. The high pass muffler of claim 1, wherein a cross-section of the aperture has any one of a square, round, polygon, or amorphous shape.

8. The high pass muffler of claim 1, wherein a portion of the muffler protrudes beyond the air exhaust passage.

9. The high pass muffler of claim 1, wherein the outer body has a shape that corresponds to an inner surface of the air exhaust passage.

10. The high pass muffler of claim 1, wherein the outer body is assembled from two halves.

11. A pneumatic tool comprising: an air intake passage; an air exhaust passage; and a muffler disposed in the air exhaust passage, the muffler including: an outer body having an inner surface; an inner body that is substantially hollow disposed within the outer body and including an aperture, wherein the inner body is adapted to allow for substantially unrestricted airflow through the air exhaust passage; and a channel formed in the inner surface and having a first terminal end disposed proximate to the aperture, a second terminal end disposed distal to the aperture, and a curved portion or an angular corner disposed between the first and second terminal ends to collectively create a Helmholtz type resonator.

12. The pneumatic tool of claim 11, wherein the muffler is tuned to resonate at any one of a quarter wavelength, a half wavelength, or a full wavelength of a target frequency.

13. The pneumatic tool of claim 11, wherein the channel includes the angular corner and follows a substantially circuitous path.

14. The pneumatic tool of claim 11, wherein the inner body is coupled to the outer body via an interference fit.

15. The pneumatic tool of claim 11, wherein a cross-section of the aperture has a one of a square, round, polygon, or amorphous shape.

16. The pneumatic tool of claim 11, wherein a portion of the muffler protrudes beyond a body of the pneumatic tool.

17. The pneumatic tool of claim 11, wherein the outer body has a shape that corresponds to an inner surface of the air exhaust passage.

* * * * *